July 17, 1962  B. B. WINER ET AL  3,044,838
BEARING MOUNTING ASSEMBLY
Filed Dec. 30, 1958  2 Sheets-Sheet 1

# United States Patent Office 3,044,838
Patented July 17, 1962

3,044,838
BEARING MOUNTING ASSEMBLY
Bernard B. Winer, Pittsburgh, and Victor G. Sorokin, Trafford, Pa., assignors to Westinghouse Electric Corporation, East Pittsburgh, Pa., a corporation of Pennsylvania
Filed Dec. 30, 1958, Ser. No. 783,955
4 Claims. (Cl. 308—122)

The present invention relates, in general, to bearing mounting assemblies, and more particularly relates to a bearing mounting assembly wherein the bearing self-aligns itself with the shaft it supports.

There is a tendency, especially in large rotating equipment, to design bearings with a larger diameter and shorter length than the conventional bearing. Such a bearing saves mounting space which, at times, can be at a premium. With self-aligning bearings this tendency, to larger diameters and shorter lengths, leads to alignment problems for the bearing itself within its support assembly. The self-alignment becomes less certain due to the diminishing of the moment which sets the bearing in true position. Since the bearings are designed with shorter length, the moment arm of the aligning moment is reduced. Further hindering the self-alignment of the bearing is the larger diameter of the bearing which, in turn, increases the friction moment arm tending to resist the self-alignment of the bearing within the mounting assembly. With a larger diameter bearing, the moment arm of the friction force tending to resist self-alignment can become excessive as the diameter of the bearing increases and the length decreases. As a result the bearing is unable to align itself.

An object of our invention is to provide a bearing mounting assembly capable of diminishing the friction moment opposing self-alignment of the bearing.

Another object of our invention is to provide a bearing mounting assembly capable of sufficiently relieving the bearing load on the bearing seat to allow the bearing to align itself.

Further objects and advantages of our invention will be readily apparent from the following detailed description, taken in conjunction with the accompanying drawing, in which.

Figure 1:
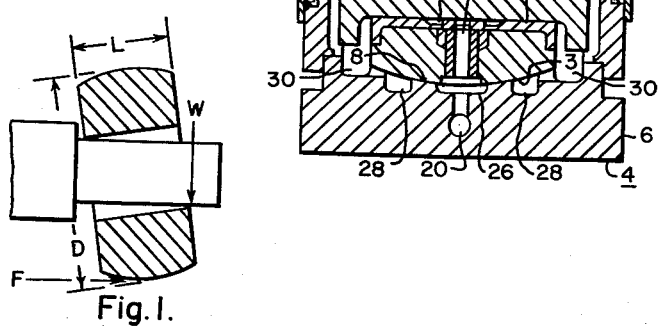
FIGURE 1 is a diagram of the forces acting upon a self-aligning bearing.

FIG. 1 shows a diagrammatic illustration of the forces acting upon and retarding the self-alignment of the bearing. The bearing is of a given length L and diameter D and has an opening therethrough for rotatably supporting a shaft, the bearing clearance being greatly exaggerated for clarity of illustration. The forces tending to align the bearing and those tending to oppose alignment of the bearing all act about the center of the bearing itself. The bearing load W tends to align the bearing with the force of a moment equivalent to the bearing load multiplied by a moment arm equal to one-half the length L of the bearing, which tends to rotate the bearing about its center. This self-aligning moment must be larger than the forces tending to oppose alignment, namely, the friction moment. The friction moment is equivalent to the friction force F multiplied by one-half the diameter D of the bearing. The friction force, in turn, is equivalent to the bearing load multiplied by the coefficient of friction between the outer surface of the bearing and the bearing seat. For the bearing to self-align itself, the moment tending to cause alignment must be larger than the friction moment. In other words, $$W\left(\frac{L}{2}\right) > F\left(\frac{D}{2}\right)$$

or $$W\left(\frac{L}{2}\right) > W\mu\frac{D}{2}$$

where $\mu$ is the coefficient of friction. It can be seen that if the length L of the bearing becomes smaller and the diameter D of the bearing becomes larger, the alignment of the bearing will become less certain as its length and diameter decrease and increase, respectively.

Figure 4:
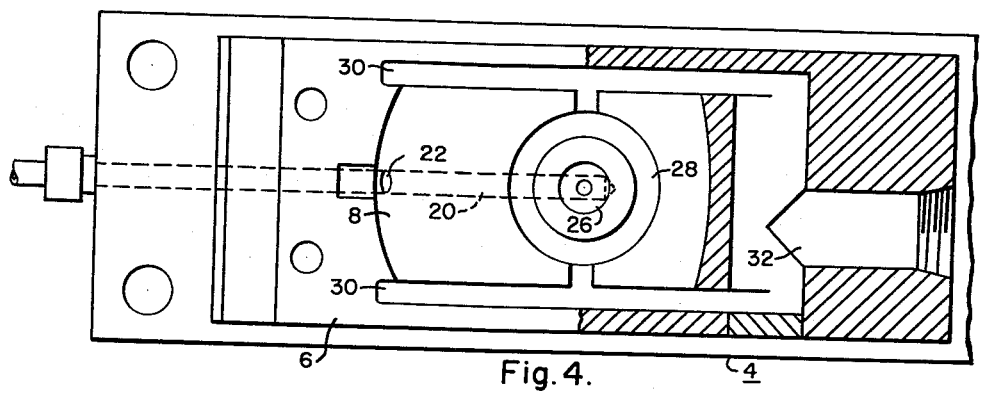
FIG. 4 is a cross-sectional top view of a bearing mounting assembly taken along the line IV—IV in FIG. 2 with the bearing removed.
Figure 3:
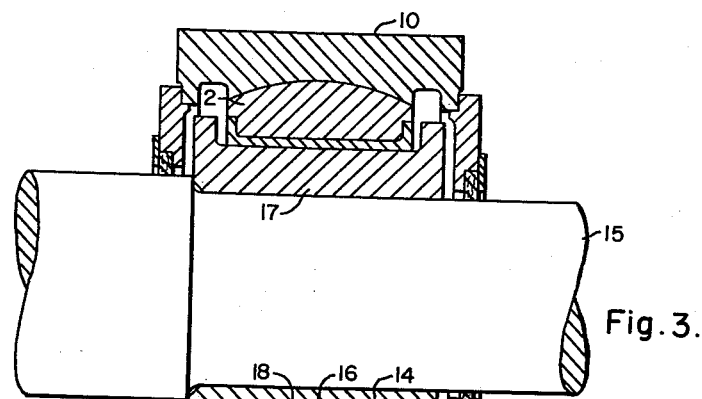
FIG. 3 is a cross-sectional side view taken along the line III—III in FIG. 2 with a shaft inserted therein.
Figure 2:
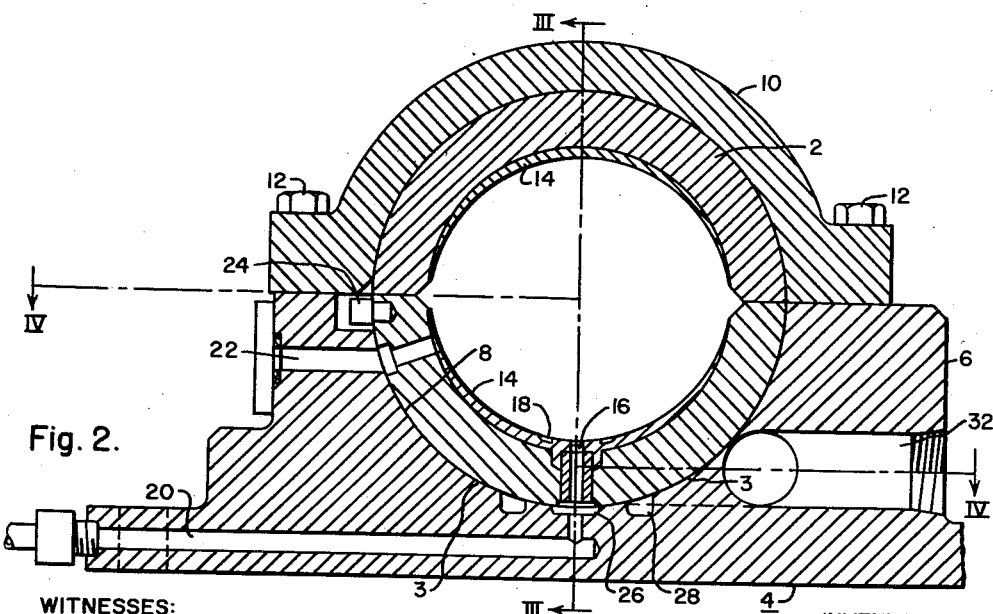
FIG. 2 is a cross-sectional end view of a bearing mounting assembly embodying our invention.

Our invention facilitates the self-alignment of the bearing by diminishing the friction force F which opposes the self-alignment. This is accomplished by relieving the bearing seat of part of the bearing load. FIGS. 2 and 3 show a bearing 2 within a bearing mounting assembly 4 which embodies our invention. The bearing mounting assembly 4 has a lower support member 6 with a bearing seat 8 formed therein. A bearing cap 10 is secured to the lower support member 6 by any suitable means, shown as bolts 12. The self-aligning bearing 2 is positioned between the bearing cap 10 and the lower support member 6 with the outer surface 3 of the bearing 2 defining a contact area with the bearing seat 8. The bearing seat 8 is shown spherical in nature in cooperation with the spherical outer surface 3 of the bearing 2. The bearing 2 is shown as a split bearing lined with suitable material such as Babbitt lining 14. A shaft 15 carrying a shaft sleeve 17 is rotatably supported by the bearing 2.

A conventional oil lift opening 16 extends throuh the lower half of the bearing 2. A relief 18 is formed within the bearing surface or Babbitt lining 14 so that pressurized oil entering through the bearing oil lift opening 16, upon start up of the machine, will lift the shaft 15 and the shaft sleeve 17 from the bearing surface 14 on the lower portion of the bearing 2 so the surface 14 and the journal will not be injured. A conduit means shown as a passageway 20 through the lower support member 6 furnishes means for connecting a source of pressurized lubricating oil to the oil lift opening 16.

A conventional oil inlet passageway 22 extends through the lower support member 6 and through the bearing 2 and bearing surface 14. The inlet passageway 22 furnishes means for supplying oil continuously to the bearing 2 for lubricating purposes as the shaft 15 rotates. Overflow passageways 30 at each end of the lower support member 6 are connected to a discharge passage 32 leading out of the lower support member 6. The lubricating oil, as well as the pressurized oil lifting the shaft sleeve 17 from the bearing surface 14, travels to the ends of the bearing 2 where it enters the overflow passageway 30. The discharge passage 32 communicating with the overflow passageways 30 allows the oil to leave the bearing mounting assembly 4.

A stop dowel 24 positioned with the lower support member 6 and extending into the lower half of the bearing 2 prevents rotation of the bearing 2 within the self-aligning bearing assembly 4. This completes the construction of a conventional bearing mounting assembly and self-aligning bearing.

As mentioned previously, the tendency to design bearings with shorter lengths and larger diameters necessitates the need of overcoming the friction force which opposes self-alignment of the bearing within the bearing assembly 4. While means have been conventionally provided for lifting the shaft journal from the bearing surface 14 upon start up of the machine, no provisions have heretofore been made for reducing the friction force tending to oppose self-alignment.

Our invention provides means for sufficiently relieving the bearing seat 8 of the bearing load to allow the self-aligning bearing 2 to properly position itself within the bearing support structure 4. To this end, a relief is formed in the bearing seat 8 under the outer surface 3 of the bearing 2. The lower support member 6 has a circular recess 26 formed around the oil lift opening 16 so that part of the pressurized lubricating oil entering the bearing 2 is diverted to the contact area between the bearing seat 8 and the outer surface 3 of the bearing 2. To afford means for carrying the pressurized oil from the contact area the bearing seat 8 has an annular sump groove 28 formed circumjacent to the recess 26. Thus, the pressurized oil entering by way of the passageway 20 to the oil lift opening 16 is partially diverted by the recess 26. The diverted pressurized lubricating oil is forced across the contact area between the outer surface 3 and the bearing seat 8 to the sump groove 28 thereby partially relieving the bearing seat 8 of the bearing load. The sump groove 28 makes connection with the larger overflow passageways 30 which join the discharge passage 32 leading out of the lower support member 6. In such a manner, the lubricating oil which enters the oil inlet 22 for lubrication of the shaft and bearing 2 while the machine is being operated, and the pressurized lubricating oil which enters through the oil lift opening 16 to lift the shaft from the bearing surface 14, as well as the diverted pressurized oil which relieves the bearing seat 8 of the bearing load, can flow out of the bearing mounting assembly 4. A continuous flow of oil in a closed system, FIG. 5, can be utilized offering an economical arrangement while diverting excess oil from the bearing housing so that it does not enter the machine or escape from the bearing housing, which is undesirable.

By relieving the bearing seat 8 of the bearing load imposed upon it by the shaft 15 of the rotating member, the friction force, which is equal to the product of the bearing load and the coefficient of friction between the outer surface 3 of the bearing 2 and the bearing seat 8, is diminished. The diminished friction force results in a substantially decreased friction moment even though the diameter of the bearing 2 remains the same. The aligning moment, being sufficiently greater, overcomes the friction moment and acts upon the bearing 2 so that the bearing adjusts to its proper alignment with the shaft 15. In this manner, our invention allows construction of bearing assemblies making use of a large diameter bearing with a short length to conserve mounting space while retaining the self-alignment feature.

Figure 5:
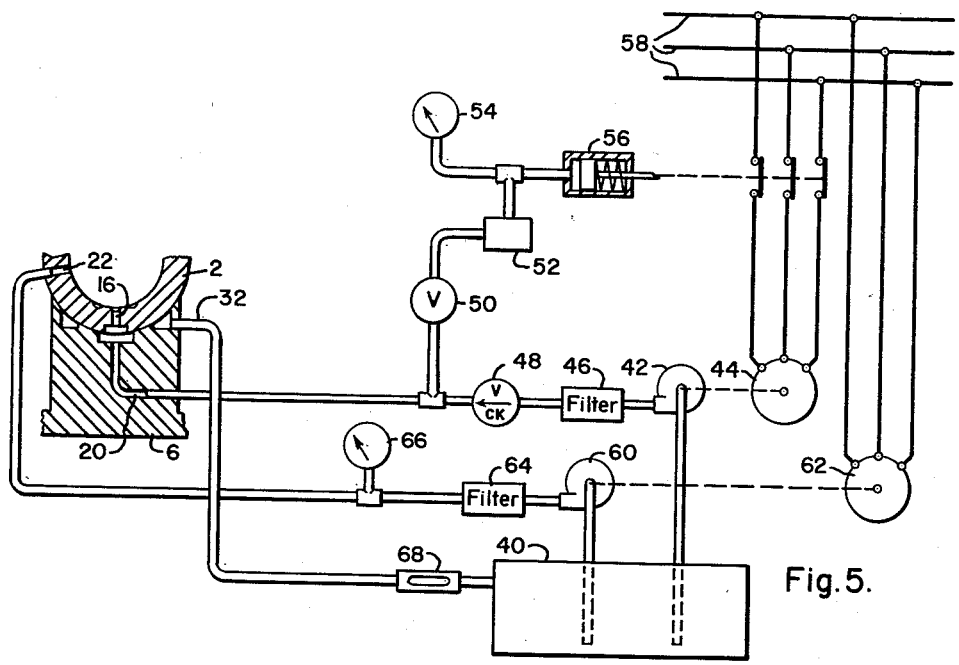
FIG. 5 is a schematic diagram of an oil circulating system usable with our invention.

Referring to FIG. 5, the bearing oil circulating system can be traced. All the oil flow through the bearing mounting assembly 4 and bearing 2 is shown originating from a common source 40, although it is to be understood that separate oil sources may be used where desired. The source of oil is shown as a sump tank 40.

Tracing the oil flow to the oil lift opening 16, an oil lift pump 42 driven by appropriate means shown as a motor 44 drives pressurized oil through a filter 46 to a check valve 48 from where it enters the passageway 20 to the oil lift opening 16. A portion of the pressurized oil from the oil lift line is tapped by means of a globe valve 50 to a pulsation damper 52. The pulsation damper 52 consists of an orifice which limits the peaks of oil pressure variations due to the pumping action of the oil lift pump 42. The pulsation damper 52 prevents the pressure peaks from reaching a pressure gauge 54 connected thereto thereby eliminating oscillations of the gauge 54 which reads the level of pressure within the oil lift opening 16. A pressure switch 56 is also connected to the pulsation damper 52 to take the pump motor 44 off the line 58 should the oil pressure rise to a dangerous level.

A conventional oil circulation line is also provided wherein an oil circulation pump 60 driven by any suitable means, shown as an electric motor 62 connected to the same power lines 58, drives the circulating oil to the oil inlet opening 22. A filter 64 and pressure gauge 66 ensure the proper state of oil to enter the oil inlet passageway 22 which provides continuous lubrication between the shaft 15 of the rotating member and the bearing surface 14. A flow sight gage 68 is provided between the exit 32 and the sump tank 40 affording means for ascertaining the oil return flow to the sump from the bearing structure.

It is now readily apparent that our invention has provided a means for overcoming the friction force which opposes the self-alignment of the bearing particularly in instances where the bearing has been specifically designed with a shorter length and larger diameter than the conventional bearing. It is to be understood that the conventional oil lift between the shaft of the rotating member and the bearing need not be used. Further, the oil inlet line may be eliminated and continuous lubrication during operation of the machine may be obtained by other means such as an oil ring, for example. If the conventional oil lift between the shaft and the bearing is used with our invention, it is to be noted that the relative proportions of the relief in the bearing lining to the contact area over which the oil pressure acts to lift the shaft and the relief in the lower support member to the contact area over which the oil pressure acts to lift the bearing will determine whether the shaft will lift relative to the bearing or the bearing will lift relative to the shaft. In most cases the relative proportions will be selected so that the shaft will lift relative to the bearing. Our invention can obviously be utilized in any arrangement wherein a self-aligning bearing of any configuration finds difficulty in aligning itself.

While our invention has been described with a certain degree of particularity for the purposes of illustration, it is to be understood that all equivalents, alterations, and modifications within the spirit and scope of our invention are herein meant to be included.

We claim as our invention:

1. A self-aligning bearing assembly comprising a non-rotating self-aligning bearing member having a substantially spherical outer surface and having a cylindrical inner bearing surface for supporting a rotatable shaft, a bearing support member having a spherical surface engaging the outer surface of the bearing member, first oil supply means for supplying lubricating oil to said bearing surface, a recess in one of said engaging surfaces of the bearing member and the support member, and second oil supply means for supplying oil to said recess under sufficient pressure to cause the oil to flow from the recess between the engaging surfaces.

2. A self-aligning bearing assembly comprising a non-rotating self-aligning bearing member having a substantially spherical outer surface and having a cylindrical inner bearing surface for supporting a rotatable shaft, a bearing support member having a spherical surface engaging the outer surface of the bearing member, first oil supply means for supplying lubricating oil to said bearing surface, a recess in one of said engaging surfaces of the bearing member and the support member, an annular groove in one of said engaging surfaces surrounding the recess and spaced therefrom, second oil supply means for supplying oil to said recess under sufficient pressure to cause the oil to flow between the engaging surfaces from the recess to the groove, and means for draining oil from the groove.

3. A self-aligning bearing assembly comprising a non-rotating self-aligning bearing member having a substantially spherical outer surface and having a cylindrical inner bearing surface for supporting a rotatable shaft, a bearing support member having a spherical surface engaging the outer surface of the bearing member, first oil supply means for supplying lubricating oil to said bearing surface, the bearing member having a passage extending therethrough from the bearing surface to the outer surface, a recess in one of said engaging surfaces of the bearing member and the support member, said recess surrounding said passage and communicating therewith, and second oil supply means for supplying oil to said recess under sufficient pressure to cause the oil to flow from the recess through said passage and from the recess between the engaging surfaces of the bearing member and the bearing support.

4. A self-aligning bearing assembly comprising a nonrotating self-aligning bearing member having a substantially spherical outer surface and having a cylindrical inner bearing surface for supporting a rotatable shaft, a bearing support member having a spherical surface engaging the outer surface of the bearing member, first oil supply means for supplying lubricating oil to said bearing surface, the bearing member having a passage extending therethrough from the bearing surface to the outer surface, a recess in one of said engaging surfaces of the bearing member and the support member, said recess surrounding said passage and communicating therewith, an annular groove in one of said engaging surfaces surrounding the recess and spaced therefrom, and second oil supply means for supplying oil to said recess under sufficient pressure to cause the oil to flow from the recess through said passage and from the recess between the engaging surfaces to said groove.

References Cited in the file of this patent
UNITED STATES PATENTS

| | | |
|---|---|---|
| 1,745,871 | Spillman | Feb. 4, 1930 |
| 2,003,316 | Schein | June 4, 1935 |
| 2,014,160 | Bary | Sept. 10, 1935 |
| 2,621,086 | King | Dec. 9, 1952 |
| 2,690,936 | Cameron | Oct. 5, 1954 |
| 2,695,199 | Blizard | Nov. 23, 1954 |
| 2,712,965 | Potts | July 12, 1955 |